L. SPAULDING.
Improvement in Devices for Tapping Pipes.
No. 129,869. Patented July 23, 1872.
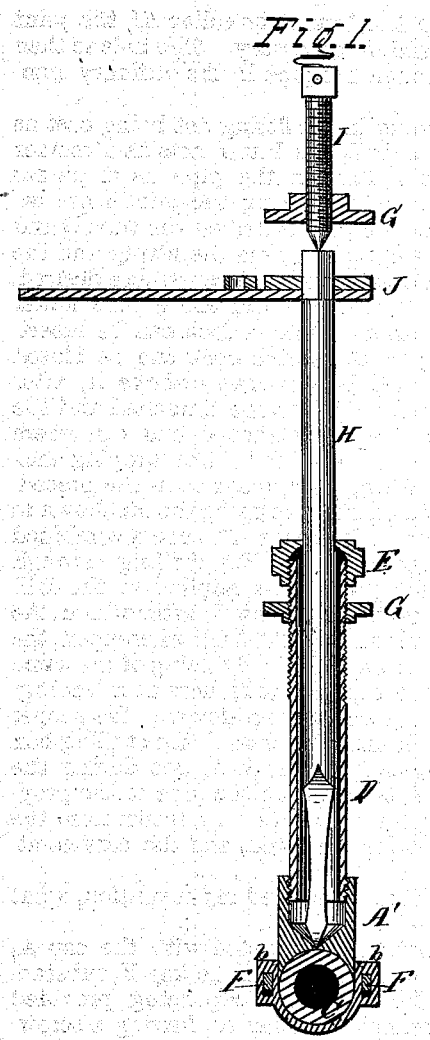
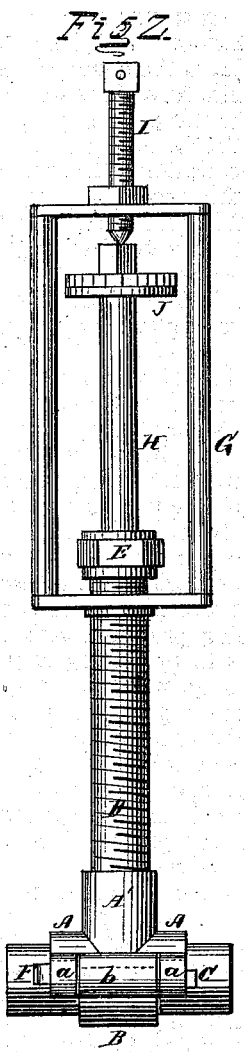
Witnesses,
Inventor.
Leander Spaulding.

UNITED STATES PATENT OFFICE.

LEANDER SPAULDING, OF NORFOLK, VIRGINIA.

IMPROVEMENT IN DEVICES FOR TAPPING PIPES.

Specification forming part of Letters Patent No. 129,869, dated July 23, 1872.

*To all whom it may concern:*

Be it known that I, LEANDER SPAULDING, of Norfolk, in the county of Norfolk and State of Virginia, have invented a new and useful Device for Tapping Pipes; and I do hereby declare the following to be a full, clear, and exact description of the same, reference being had to the accompanying drawing forming part of this specification, in which—

Figure 1 is a vertical cross-section, and Fig. 2 a side elevation.

Similar letters of reference in the accompanying drawing indicate the same parts.

The object of this invention is to facilitate the tapping of gas, water, and steam pipes, and to prevent the escape of the contents of the pipe during the operation. To this end it consists, first, in the employment of a peculiar "fitting" for the pipe; and, secondly, in the combination therewith of a drill specially adapted to be used in connection with such fitting, as hereinafter set forth.

In the drawing, A represents a cap, which fits upon the pipe C, as shown in Fig. 2, the same being provided with a tubular branch, A', and with projecting lugs $a$ $a$ on each side. B is a strap, which fits around the opposite side of the pipe, its ends $b$ $b$, which are enlarged, fitting between the lugs $a$ $a$. The lugs $a$ $a$ and the enlarged ends $b$ $b$ are pierced to receive a tapering key, F, when in line, which key connects them together and binds them firmly to the pipe. This completes the "fitting" above referred to.

The drill consists of the following parts, viz.: A tube, D, adapted to be screwed into or upon the branch A'; a bit, H, working in and guided in its movement by the tube D; a nut, E, screwing upon the top of the tube to center the bit, its joints, both with tube and bit, packed and fitted steam, air, and water tight; a yoke, G, the lower part of which is tapped to work on a screw-thread cut in the outer surface of the tube D; a set-screw, I, for giving pressure to the drill; and a ratchet, J, for rotating the drill.

In tapping pipes the fitting is applied and secured by the key F, as above described, the joint between the fitting and the pipe being packed with any cement or other substance suitable for the purpose. The tube D is then screwed to the branch or collar A', the joint being packed, if necessary. The hole is then drilled through the pipe in the ordinary manner.

The opening in the fitting not being cast as large as the drill, the latter acts as a reamer and forces a burr in the pipe as it passes through, thereby making the joint more secure. After the pipe is drilled the tube D and drill can be detached from the fitting and the branch pipe attached and run where desired.

In case it is desired to tap a pipe under pressure without waste, a cock can be inserted in the part A', which cock can be closed when the drill is withdrawn above it, after which the tube D can be detached and the branch-pipe can be attached and run where desired, as above stated. For tapping gas-mains the fitting is applied as in the preceding case; but, instead of using the bit shown in the drawing, it is proposed to use a combined drill, reamer, and tap. For drilling through the pipe the pressure is applied to the drill by means of the set-screw I, after which the yoke is revolved with the drill, whereupon, the screw-thread on the tube D being of the same pitch as the tap, the tube acts as a leading-screw and forces the tap down at the proper speed for forming the thread, the stuffing-box at E preventing any leak of gas during the process. After tapping the pipe to the proper depth the tap can be withdrawn from the pipe, the fitting removed, and the service attached.

Having thus described my invention, what I claim is—

1. The fitting constructed with the cap A, the clamp or strap B, and the key F, substantially as described, the cap being provided with the branch or collar A', having a screw-thread, for the purposes herein set forth.

2. In combination with the drill, the frame G, and the fitting, as herein described, I claim the tube D, adapted to be screwed to the collar A' and to guide and feed the drill, substantially as and for the purposes specified.

LEANDER SPAULDING.

Witnesses:
 H. C. GUY,
 ELIAS E. GUY.